United States Patent [19]
Pingel

[11] Patent Number: 5,863,048
[45] Date of Patent: Jan. 26, 1999

[54] ARRANGEMENT FOR THE CENTRALIZED SUPPLY OF SEVERAL FRICTION POINTS WITH AN OIL/AIR MIXTURE

[75] Inventor: Hans Pingel, Pegnitz, Germany

[73] Assignee: Baier & Koppel GmbH & Co., Pegnitz, Germany

[21] Appl. No.: 895,967

[22] Filed: Jul. 17, 1997

[30] Foreign Application Priority Data

Jul. 29, 1996 [DE] Germany ................. 296 13 087.7

[51] Int. Cl.$^6$ ............................. F16L 17/06; F16J 15/02
[52] U.S. Cl. ..................... 277/609; 137/561 A; 277/630
[58] Field of Search ...................... 277/609, 616, 277/630, 637; 222/478; 239/548; 137/561 A

[56] References Cited

U.S. PATENT DOCUMENTS

| | | | |
|---|---|---|---|
| 3,933,358 | 1/1976 | Hoer | 277/637 |
| 4,836,246 | 6/1989 | Lemp | 137/561 A |
| 4,840,018 | 6/1989 | Deutsch | 137/561 X |

*Primary Examiner*—Jose V. Chen
*Assistant Examiner*—Karlena D. Schwing
*Attorney, Agent, or Firm*—Friedrich Kueffner

[57] ABSTRACT

An arrangement for the centralized supply of several friction points with an oil/air mixture, wherein several lubricant distributors are arranged in a row one behind the other in a bore of a housing having lubricant ducts and wherein the lubricant distributors are sealed from each other at least at the outside by sealing members against a transfer of the oil/air mixture. The lubricant distributors are combined and connected to form a column-like structural unit. Hollow screws are provided which hold the lubricant distributors together to maintain the column-like structural unit, wherein the hollow screws have throughopenings for the oil/air mixture which are in alignment with throughopenings of the lubricant distributors. In addition, a device is provided for introducing the structural unit into the bore of the housing and for moving the structural unit out of the bore of the housing.

9 Claims, 3 Drawing Sheets

ARRANGEMENT FOR THE CENTRALIZED SUPPLY OF SEVERAL FRICTION POINTS WITH AN OIL/AIR MIXTURE

BACKGROUND OF THE INVENTION

1. Field of the Invention

The present invention relates to an arrangement for the centralized supply of several friction points with an oil/air mixture, wherein several lubricant distributors are arranged in a row one behind the other in a bore of a housing having lubricant ducts and wherein the lubricant distributors are sealed from each other at least at the outside by means of sealing members against a transfer of the oil/air mixture.

2. Description of the Related Art

The arrangement mentioned above is intended especially for the centralized supply of the lubricating points of roll stands or wire trains. In such devices, several friction points, for example, the bearings and sealing members of the individual rolls in the case of a rolling train, are arranged spaced apart from each other and are to be supplied with lubricant. In the past, individual lines were provided from a central oil/air mixer to the friction points of the rolls. This was structurally cumbersome and also difficult to assemble. Most importantly, these supply lines had to be disassembled when the rolls had to be exchanged.

In order to avoid these disadvantages, it is also known in the art to arrange several lubricant distributors one behind the other in a bore of a housing, wherein the housing is part of a frame or the like containing the friction points, for example, the frame of a roll stand. Appropriate lubricant ducts which serve to conduct an oil/mixture to the bearing points and sealing members are provided in the housing. Such an oil/air mixture is composed of air in which oil is finely distributed.

The operation of the arrangement described above is satisfactory. However, the known arrangement has the disadvantage that the assembly and disassembly is complicated. The individual lubricant distributors must successively be introduced into the bore and, in case a repair is required, must successively be removed individually from the bore. This is cumbersome. In addition, there is the danger that, when the respective operating person is not careful, the prescribed sequence of the lubricant distributors is not adhered to during the assembly, i.e., when the lubricant distributors are introduced into the bore. An additional effort is required during the assembly to insert the sealing rings to be provided between the individual lubricant distributors and to ensure that these sealing rings assume the required position in which they provide a problem-free sealing action and that they are not damaged when they are moved past bores.

SUMMARY OF THE INVENTION

In view of the prior art discussed above, it is the primary object of the present invention to improve the arrangement of the above-described type in such a way that the assembly as well as the disassembly of the lubricant distributors and the sealing members thereof can be carried out quickly and without problems, i.e., without the danger of assembly errors and damage to sealing members when they are moved past bores.

In accordance with the present invention, the lubricant distributors are combined and connected to form a column-like structural unit. In addition, means are provided for introducing this structural unit into the bore of the housing and for moving the structural unit out of the bore of the housing.

The structural unit according to the present invention can be inserted into the bore and pulled out of the bore as necessary in a simple manner and much more quickly than the known arrangement discussed above. Since the lubricant distributors and the sealing members thereof are combined to form this structural unit outside of the bore, the assembly errors which may occur in the prior art arrangement are not possible; at the very least, any assembly errors can be determined by a subsequent check of the assembled structural unit and can be corrected prior to mounting the structural unit in the bore. The same certainty in the assembly and inspection of any errors exists with respect to the sealing members.

In accordance with a preferred embodiment, the lubricant distributors have throughopenings for the oil/air mixture extending in the longitudinal direction of the lubricant distributors. In addition, hollow screws are provided which hold the lubricant distributors together to maintain the column-like structural unit, wherein the hollow screws have in their interior also throughopenings for the oil/air mixture which throughopenings are in alignment with the throughopenings of the lubricant distributors. In addition to serving to clamp the individual lubricant distributors of the column-like structural unit together, the screws press the structural unit against the closed end of the blind-end bore, so that the unit is tightly and immovably held in the bore. In addition, the screws have central openings for supplying the lubricant to the structural unit.

In accordance with another preferred embodiment of the invention, the sealing members are of an elastic material and each sealing member is located between two opposing end faces of two successively arranged lubricant distributors and each sealing member can be placed in its sealing position and clamped in the sealing position by means of the tightening force of a tightening screw. Accordingly, the tensioning function of the tensioning screw is utilized for tensioning the sealing members, preferably the sealing rings, in their sealing positions relative to the surfaces of the lubricant distributors contacting the sealing members and for achieving the desired sealing effect in this manner.

In accordance with another feature, the outer circumferential surface of one of the opposing end faces has a recess whose diameter is reduced as compared to the outer diameter of the respective distributor portion and whose height is approximately equal to the diameter of an O-ring serving as the sealing member. This configuration makes it possible to accommodate and simultaneously secure a sealing ring in the area of one of the end faces of the respective lubricant distributor.

In accordance with another advantageous further development, when the tensioning screw is not tensioned, the sealing rings located in the outer portions of the contact surfaces between two lubricant distributors and an end equalization piece do not protrude beyond the outer diameters of the lubricant distributors and the end equalization piece, while, when the tightening screw is tightened, the sealing rings are not only compressed, but the diameter of the sealing rings is also increased outwardly as a result of sliding on an inclined surface of the recess formed in one of the opposing end faces of the lubricant distributors. Consequently, the sealing rings protrude beyond the outer diameters of the parts of the lubricant distributor which receive the sealing rings and extend through the gap between the inner wall of the bore and the outer side of the lubricant distributor. As a result, the sealing rings act to seal relative to the opposing end faces of two adjacent lubricant distributors as well as relative to the wall of the bore surrounding the sealing rings. The same advantages are achieved analogously when sealing rings are provided in the inner areas of the lubricant distributors.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 5:
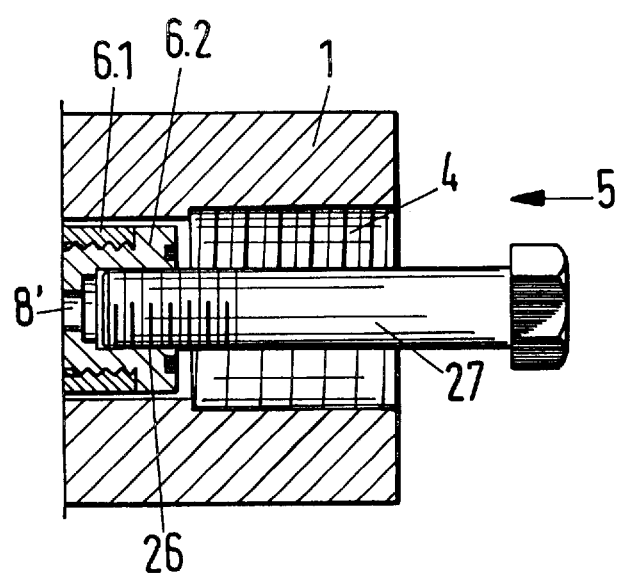
FIG. 5 is a partial sectional view showing the placement of an assembly screw pulling the column-like structural unit out of the housing.

The drawing shows a housing 1 which is part of a bearing housing provided with friction points, for example, the bearing housing of a roll stand. A bore 2 is provided in the housing 1, wherein the bore 2, for example, ends in a blind-end hole 3. At the opposite side, the bore 2 has a freely accessible opening 4, as also shown especially in FIG. 5. A column-like structural unit is inserted into the bore 2 in the direction of arrow 5 at the opening 4, as also shown in FIG. 5.

The structural unit is composed of a number of lubricant distributors 6, wherein, in the illustrated embodiment, two such lubricant distributors and an end equalization piece 11 are provided. These lubricant distributors are held together by means of hollow screws 8 to form the aforementioned structural unit. For this purpose, the hollow screw 8 shown on the left hand side in FIGS. 1 and 2 is screwed to the end equalization piece 11, while the hollow screw 8 located approximately in the middle of FIGS. 1 and 2 is screwed to an access screw connection 6.2 of the lubricant distributor.

The lubricant distributor 6 further includes a distributor sleeve 6.1, a distributor insert 6.3, and exit screw connection 6.4 as well as a divider ring 9 and sealing elements. A circumferential collar of the hollow screw 8 rests against the end of an exit screw connection 6.4 located on the right hand side as shown in the drawings. The exit screw connections 6.4 are screwed to the adjacent distributor sleeve 6.1 located on the left hand in the drawings. The respectively other portion of the distributor sleeves 6.1 located on the right hand side as shown in the drawings is screwed to one of the access screw connections 6.2. One of intermediate spaces 15 to be explained in detail below with respect to the operation of the tightening screw 7 is formed between the access screw connection 6.2 located approximately in the middle of the structural unit and the adjacent exit screw connection 6.4.

Figure 1:
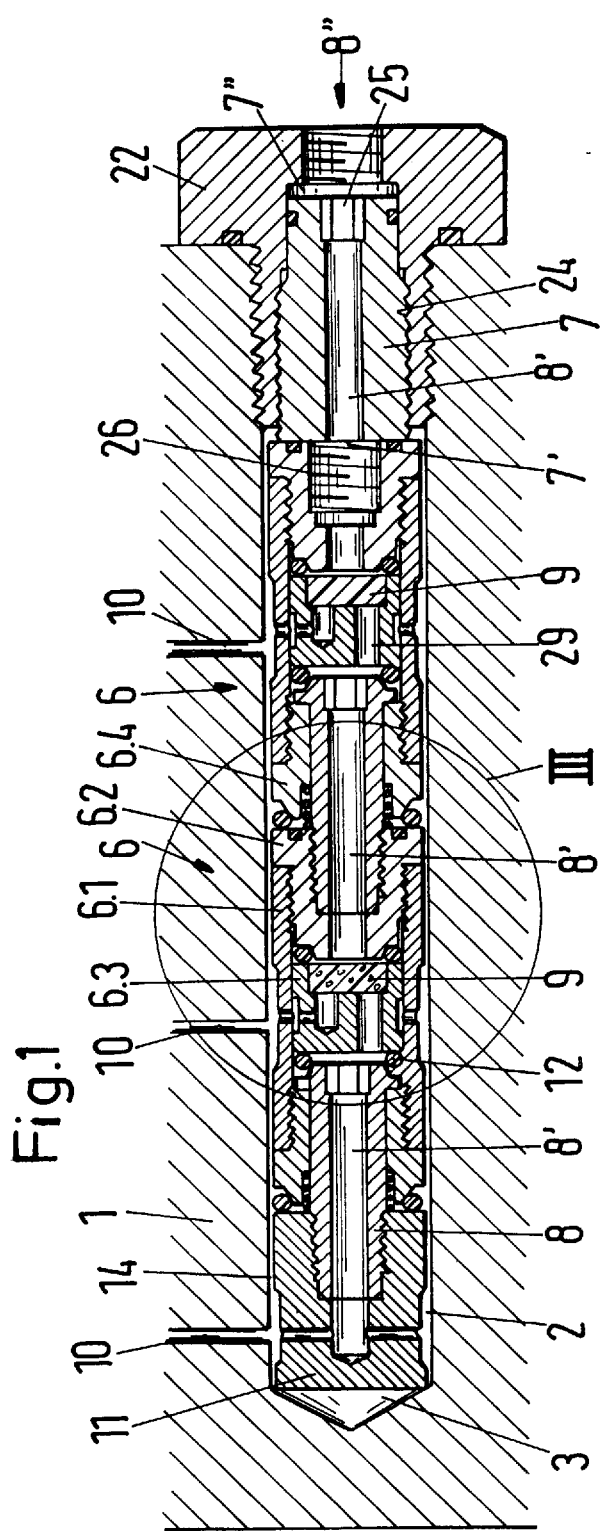
FIG. 1 is a longitudinal sectional view of an embodiment of the present invention shown in the position in which the tightening screw is not tightened.
Figure 2:
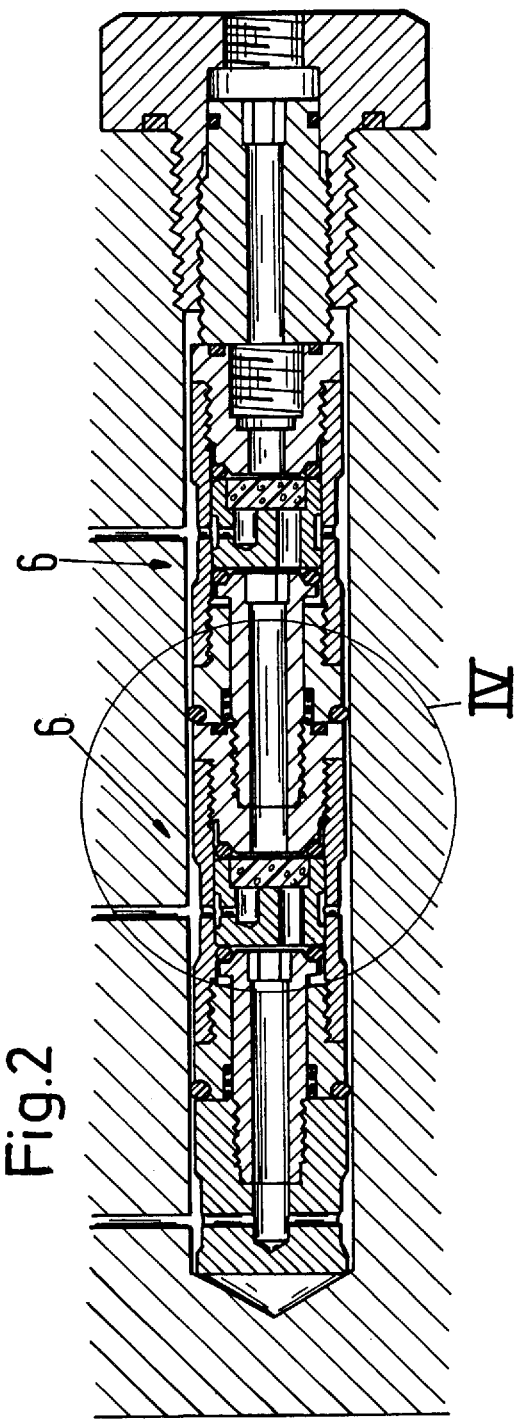
FIG. 2 is a longitudinal sectional view corresponding to FIG. 1, but showing the tightening screw in the tightened position.

The access screw connection 6.2 located on the right hand side in the drawings, which is screwed to the corresponding end portion of the distributor sleeve 6.1, has at its end located on the right as shown in FIG. 1, i.e., toward the tightening screw 7, a threaded bore 26 which is accessible from the outside and is provided for receiving an assembly screw 27 to be explained in detail below. Consequently, the hollow screws 8 hold the structural unit described above together with the springs 21, to be explained in detail below, being untensioned; by means of the assembly screw 27, the structural unit can be inserted into the bore 2 and can be pulled out of the bore 2.

A continuous opening 8' extends through the tightening screw as well as through the hollow screws. The compressed air or the mixture of compressed air and oil entering at 8" flows through this continuous opening 8' to the distributor rings 9 which are each supported by a distributor insert 6.3. In the distributor rings 9, the oil/air mixture is finally distributed and is then conducted through the lubricant lines 10 to the individual friction points. Through a pipeline connected to the continuous opening 8', a compressed air and oil mixture can be conducted to the continuous opening 8' at 8". Another portion of the oil/air mixture flows from the distributor rings 9 through the connecting line 29 toward the left to another distributor ring 9 or to another lubricant line 10.

The distributor rings 9 mentioned above are composed of a porous insert which acts like a sponge. The porous insert stores the liquid lubricant particles, comminutes them into small droplets and transfers them to the air which flows though. Since the same flow conditions of the compressed air exists at all exit points, a proportionally uniform lubricant discharge takes place to the friction points to be supplied with lubricant by the arrangement according to the present invention.

Inner sealing members 12 and outer sealing members 13, preferably in the form of so-called O-rings are provided, wherein these sealing members are capable of sealing the lubricant distributor 1 with respect to its inner area which surrounds the supply bore 8' as well as the outer area, i.e., the gap 14 between the outer circumference of the lubricant distributor and the inner wall of the bore 2.

The sealing members 12, 13 mentioned above are located between oppositely located end faces 16, 16', 17 and 17' of two adjacent lubricant distributors, or between a lubricant distributor and an end equalization piece 11. One of these end faces is provided with a recess 18 or 19 in which the respective sealing ring 12 or 13 is partially located in the untensioned state. Toward the respective end face 16, 16', 17 or 17', the bottom 20 of each recess forms a conical space which expands toward the respective distributor. The distance between the area 20' having the greater diameter of the conical space and the diameter of the outer circumference 28 is smaller than the diameter of the respective sealing ring, i.e., the O-ring 12 or 13.

Figure 3:
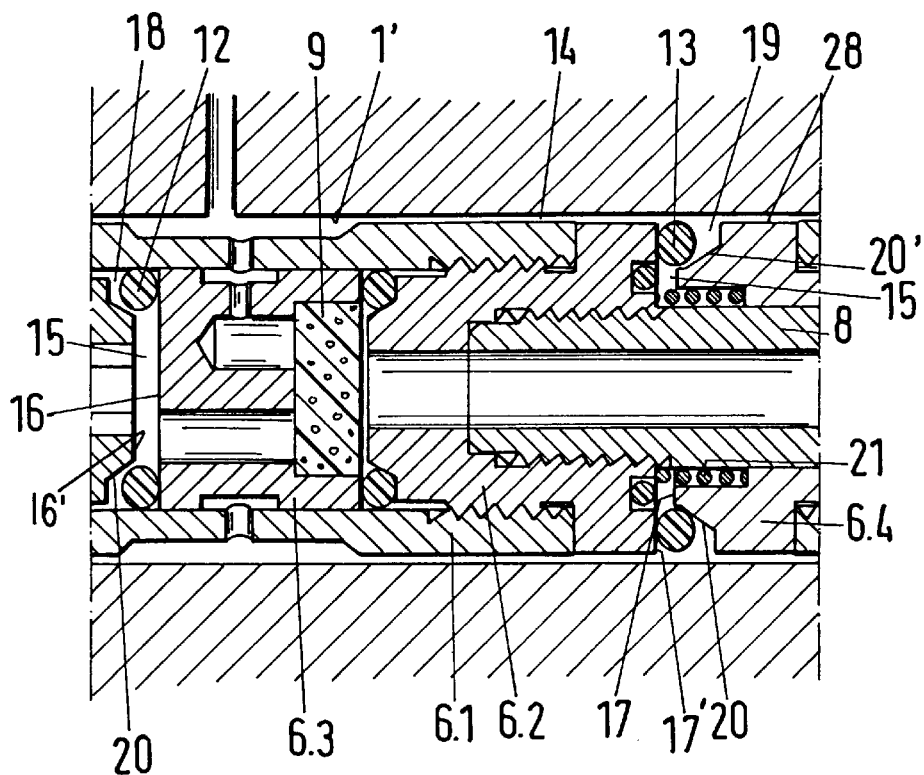
FIG. 3 is sectional view, on a larger scale, showing detail III of FIG.
Figure 4:
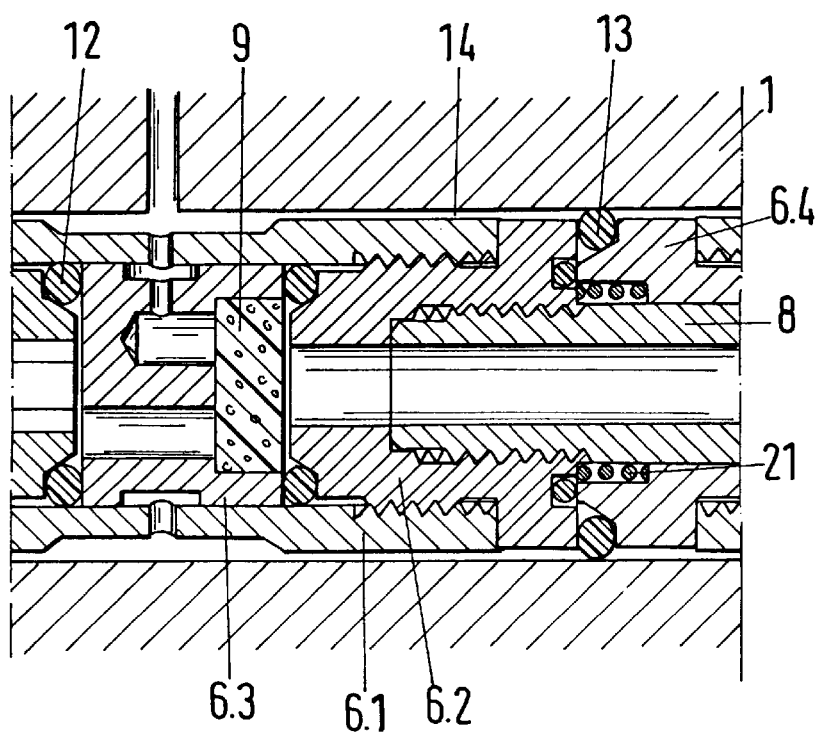
FIG. 4 is sectional view, on a larger scale, showing detail IV of FIG. 2.

In the untensioned state, an intermediate space 15 exists between the end faces 16, 16', 17 and 17', wherein the intermediate space 15 is maintained by a compression spring 21. After tightening the tensioning screw, the lubricant distributors 6 are pressed against each other, so that the respective exit screw connection 6.4 slides onto the corresponding hollow screw 8 and the compression springs 21 are compressed. Simultaneously, the sealing rings 12, 13 are pressed along the inclined bottom surfaces 20 into the recess 18 or 19 and are simultaneously radially expanded outwardly until the aforementioned components of the structural unit have assumed the tensioned position shown in FIGS. 2 and 4. In that state, the sealing rings 12, 13 rest tightened against the respective end faces 16, 16', 17 and 17' 16, 16', 17 and 17' while they are also pressed outwardly to such an extent that they fill out the gap 14 existing between the outer circumference 28 and the inner wall 1' of the housing 1 and rest sealingly against the aforementioned inner wall 1', as illustrated in FIG. 3. Consequently, it is possible to provide a gap 14 having a certain width in order to compensate finishing tolerances in the manufacture of the diameter of the bore 2 and also of the outer diameter 28 and to make it possible to provide during the assembly and disassembly a sufficient play between the structural unit and the inner wall of the bore 2.

Consequently, it is apparent that the tightening screw 7 serves two functions. On the one hand, the tightening screw 7 serves to firmly tighten the individual lubricant distributors 6. On the other hand, the tightening screw 7 places the sealing members 12, 13 in their sealing positions and also tightens the sealing members 12, 13.

A flange 22 is screwed to the housing 1 at the open side 4 of the bore 2. The tightening screw 7 has an external thread which, as indicated by reference numeral 24, is screwed to the corresponding internal thread of the flange. In the head 7" located at the open side 4, the tightening screw has a hexagonal recess 25 into which a corresponding hexagonal wrench can be inserted. When turning the hexagonal wrench in tightening direction, the tightening screw 7 presses with its end face 7' against the lubricant distributor 6 which is located farthest right in FIG. 1 and, consequently, forces all lubricant distributors from the untightened position of FIGS. 1, 3 into the tightened position of FIGS. 2, 4.

Figure 6:
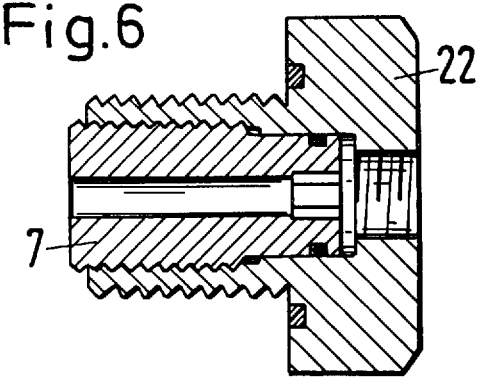
FIG. 6 is a sectional view showing the tightening screw and the fastening flange separately.

FIG. 5 of the drawing shows the housing with input side 4 and a lubricant distributor 6 with throughopening 8' for the oil/air mixture. An assembly screw 27 having an external thread can be screwed into a corresponding internal thread 26 after the flange 22 and the tightening screw 7 have been removed and set aside previously, as shown in FIG. 6. By using the assembly screw 27, the entire structural unit can be moved either into the position in the bore 2 shown in FIGS. 1, 2, or the structural unit can be pulled out again by means of the assembly screw 27.

While specific embodiments of the invention have been shown and described in detail to illustrate the inventive principles, it will be understood that the invention may be embodied otherwise without departing from such principles.

I claim:

1. An arrangement for a centralized supply of several friction points with an oil/air mixture, the arrangement comprising a plurality of lubricant distributors arranged in a row one behind the other in a bore of a housing having lubricant ducts, and sealing members for sealing the lubricant distributors relative to each other at least at an outside thereof against a transfer of the oil/air mixture, further comprising means for combining and connecting the lubricant distributors to form a column-like structural unit and means for introducing the structural unit into the bore of the housing and for moving the structural unit out of the bore of the housing.

2. The arrangement according to claim 1, wherein each lubricant distributor has a longitudinal direction and a throughopening for the oil/air mixture extending in the longitudinal direction of the lubricant distributor, the means for combining and connecting the lubricant distributors to form a structural unit comprising hollow screws, each hollow screw having in an interior thereof a throughopening for the oil/air mixture, wherein the hollow screws are mounted such that the throughopenings of the hollow screws are in alignment with the throughopenings of the lubricant distributors.

3. The arrangement according to claim 2, wherein the sealing members are of an elastic material, each sealing member having end faces, each sealing member being located between two opposing end faces of two successively arranged lubricant distributors, further comprising a tightening screw for applying a tightening force for placing the sealing members in a sealing position thereof and for tightening the sealing members in the sealing position.

4. The arrangement according to claim 3, wherein an outer circumference of one of the two oppositely located end faces has a recess, the recess having a reduced diameter relative to an outer diameter of the lubricant distributor, the sealing member being an O-ring received in the recess, the O-ring having a diameter, wherein the recess has a height approximately equal to the diameter of the O-ring.

5. The arrangement according to claim 4, wherein the recess forms a conical space expanding from the end face toward the lubricant distributor, the conical space having a portion having a greater diameter, wherein a distance exists between the area of the conical space having the greater diameter and the diameter of an outer circumference of the lubricant distributor which is smaller than the diameter of the O-ring, so that, when the structural unit is tightened by the tightening screw, the O-rings are pressed between the oppositely arranged end faces and the O-rings are forced beyond the outer circumference of the lubricant distributor into a gap defined between the housing and the lubricant distributor and the O-rings rest sealingly against an internal wall of the housing.

6. The arrangement according to claim 3, wherein, when the tightening screw is not tightened, an intermediate space exists between the end faces of the lubricant distributors, further comprising compression springs resting against the end faces and maintaining the distance between the end faces.

7. The arrangement according to claim 3, further comprising a flange screw connection tightly connected to an outer end of the housing, the tightening screw having a thread engaging in a counterthread of the flange screw connection, the tightening screw comprising means for turning the tightening screw by engagement from the outside, wherein the tightening screw has an inner end face resting against the structural unit.

8. The arrangement according to claim 1, further comprising a transport handle or assembly screw releasably connected to the structural unit.

9. The arrangement according to claim 8, wherein the transport handle or assembly screw is configured to be screwed into an outwardly facing thread of the structural unit.

\* \* \* \* \*